United States Patent [19]

Williams

[11] Patent Number: 5,559,206
[45] Date of Patent: Sep. 24, 1996

[54] PARTIALLY ESTERIFIED ROSIN BASED RESINS

[75] Inventor: Theodore J. Williams, Panama City, Fla.

[73] Assignee: Arizona Chemical Company, Panama City, Fla.

[21] Appl. No.: 396,530

[22] Filed: Mar. 1, 1995

[51] Int. Cl.$^6$ .................................................. C09F 1/02
[52] U.S. Cl. ....................... 530/210; 530/212; 530/214; 530/215; 530/218
[58] Field of Search ................................. 530/210, 212, 530/214, 215, 218

[56] References Cited

U.S. PATENT DOCUMENTS

| | | | |
|---|---|---|---|
| 2,994,635 | 8/1961 | Reaville et al. | 162/179 |
| 3,112,209 | 11/1963 | Bradley | 106/123 |
| 3,390,046 | 6/1968 | McDavid | 162/180 |
| 3,497,490 | 2/1970 | Arit et al. | 260/97.5 |
| 4,076,700 | 2/1978 | Harada et al. | 260/97.6 |
| 4,477,613 | 10/1984 | Evans et al. | 524/77 |
| 4,847,010 | 7/1989 | Maeda et al. | 530/216 |
| 4,906,733 | 3/1990 | Kodama et al. | 530/216 |
| 4,963,630 | 10/1990 | Parker | 526/238.3 |

FOREIGN PATENT DOCUMENTS 144771  7/1988  Poland .
1240765  6/1986  U.S.S.R. .

OTHER PUBLICATIONS

Bondarevskaya et al., Lakokrasoch. Mater. Ikh. Primen. (1972), (4), 17.

Gusakov et al. "Pilot–plant production of the ethers of adducts based on turpentine" Gidroliz, Lesokhim, Prom. (1970), 23 (7), 257.

*Primary Examiner*—James J. Seidleck
*Assistant Examiner*—Richard Jones
*Attorney, Agent, or Firm*—Luedeka, Neely & Graham, P.C.

[57] ABSTRACT

The specification describes a process for making highly functionalized rosin ester resins; i.e., partially esterified rosin based resins. The resins are produced by reacting fortified rosin with a polyol at superatmospheric pressure in a closed reaction vessel while retaining at least a portion of the water formed during the esterification step in the reaction vessel, thereby limiting the reaction to a desired degree of partial esterification so that a relatively high degree of residual acid functionality is achieved in the final ester product. The process enables large scale production of resins with precise control of the degree of functionality of the resins thus produced. The products are particularly useful as binders in ink formulations.

24 Claims, No Drawings

PARTIALLY ESTERIFIED ROSIN BASED RESINS

FIELD OF THE INVENTION

The invention relates to partially esterified rosin-based resins and processes for the production of such resins. More particularly, the invention relates to an improved process for the production of partially esterified rosin-based resins useful as binders in printing inks.

BACKGROUND

Rosin ester-based resins are widely used for alcohol and water-based ink and coating formulations. In order for the resins to be suitably soluble in polar protic solvents such as water and/or alcohol, the resin must have a high degree of residual reactive functionality. The degree of residual reactive functionality of the resin is related to the number of unreacted carboxylic acid and hydroxyl sites on the molecule after the reaction of an adduct of rosin with an alcohol. In general, the greater the degree of reactive functionality, the more soluble the resin is in polar protic solvents.

Typically, rosin ester-based resins of this type are made in small scale batch-type reactions. Small scale reactions are used in order to maintain sufficient control of the reaction progress so that resins with the desired degree of functionality are produced. In general, the reaction is conducted at elevated temperatures and at atmospheric pressure by first reacting rosin with an unsaturated carboxylic acid to form a rosin adduct, then reacting the rosin adduct with a polyol to form a partially esterified resin. During the latter reaction, water is formed and is constantly removed from the reaction medium as it is formed, normally with the aid of an inert gas purge.

In an attempt to maintain the desired degree of esterification, the reaction mass is quickly cooled at a certain point in an effort to limit any further esterification of the rosin adduct. However, as long as the temperature of the reaction mass remains sufficiently high, further esterification of the adduct will continue with a concomitant loss in residual functionality. While smaller scale reactions allow for better control of the esterification reaction, it is quite difficult to terminate the reaction at precisely the desired point. Furthermore, efforts to stop the reaction typically involve solidifying or flaking the resin and therefore require the end-user to solubilize the flaked resin which is energy intensive and time consuming.

The high temperatures involved in production of partially esterified rosin may also create other problems. In addition to losses in functionality, exposure to elevated temperatures subsequent to the formation reaction will typically increase the molecular weight of the resin thereby increasing the potential for gelation of the resin and loss of flowability. Higher molecular weight increases solution viscosity and may further limit solubility. Gelation renders the resin useless.

For the foregoing and for other reasons, conventional resin production techniques are significantly deficient for producing a rosin ester resin having the desired degree of residual functionality. As noted above, the highly reactive nature of the product subsequent to the esterification step has encouraged the use of relatively small scale reactions which cannot take advantage of the economies of scale realized with larger scale reactions. Furthermore, additional processing steps are required to prepare resin solutions of alcohol and/or water-amine in order to prepare ink formulations containing the resin.

Accordingly, it is an object of the invention to provide a method for making highly functionalized rosin ester resins for ink compositions.

Another object of the invention is to provide a method of the character described which enables improved control over the properties of the final resin product.

A further object of the invention is to provide a method for producing a partially esterified rosin ester resin having a target acid number.

Yet another object of the invention is to provide a method for making partially esterified rosin esters which enables the use of large scale batch reactions.

Still another object of the invention is to provide a method for making a partially esterified rosin-based resin solution directly from the rosin ester reaction mass without an intermediate processing step.

A still further object of the invention is to provide a method of the character described which is economical and relatively simple to carry out.

SUMMARY OF THE INVENTION

With regard to the above and other objects, the present invention is directed to the preparation of rosin ester resins, particularly partially esterified rosin-based resins characterized by the presence of a relatively high degree of functionality suitable for use in ink formulations. The process comprises reacting rosin with an ethylenically unsaturated carboxylic acid or anhydride in a reaction vessel to form an adduct thereof. The adduct is then reacted in a closed vessel at superatmospheric pressure and an elevated temperature with a polyol to form water and a rosin ester reaction product. During the adduct/polyol reaction, all or a portion of the water thus formed is retained in the reaction vessel in order to limit the progress of the adduct/polyol reaction, thereby enabling attainment of a desired degree of partial esterification as a function of the amount of water retained in the reaction vessel. It may be desirable in some situations to add water to the vessel as the reaction progresses.

The retention of water in the reaction mass self-limits the reaction to a desired degree of partial esterification, and the reaction mass including the reaction product is stable upon the attainment of the desired degree of esterification for prolonged periods even at the reaction conditions imposed upon the material. This facilitates improved production scheduling in the plant relative to subsequent processing of the material and also achieves more uniform product characteristics from batch to batch. Accordingly, the process of the invention provides for the precise and substantially reproducible formation of partially esterified resins.

The invention also provides a method for the direct solubilization of the adduct/polyol reaction product without the need for intermediate processing steps. If an alcohol is used as the solvent, the alcohol is preferably added directly to the material after it is cooled to about 180° C. For aqueous ink compositions, the material is first neutralized such as with an amine to form a salt and the water then added. The neutralization with an amine may also be carried out with the alcohol solution.

In a particularly preferred embodiment, the invention provides a process for preparing a partially esterified rosin based resin having a target acid number in the range of from about 80 to about 260. The process comprises reacting rosin with from about 5 to about 35 wt. % based on the weight of rosin, of an ethylenically unsaturated carboxylic acid or anhydride in a reaction vessel to form an adduct thereof. The adduct is then reacted in a closed vessel at superatmospheric pressure and an elevated temperature with from about 1 to about 40 wt. % based on the weight of rosin, of a polyol to form water and a rosin ester reaction product. In order to limit the progress of the adduct/polyol reaction to achieve partial esterification, at least a portion of the water of reaction is retained in the reaction vessel. Retention of the water of reaction in the vessel is controlled to provide the desired final acid number (degree of functionality). Further heating of the material in the vessel after attainment of the desired acid number does not significantly advance the reaction.

Thus, by controlling the amount of water retained in the reaction vessel during the adduct/polyol reaction step, a partially esterified rosin based resin may be produced which is stable at the reaction conditions. Furthermore, batch to batch variation of the degree of esterification of the product can be reduced by retaining the same relative amount of water in the reaction mass from batch to batch. As a consequence, relatively large quantities of resin may be held within the reaction vessel for as long as 24 hours during or after which the resin may be packaged by any of the known packaging methods, or the resin may be incorporated directly into a resin solution by solvation with an alcohol or other suitable solvent.

Since the final resin product is stable at reaction temperatures which provide a relatively low viscosity, handling is improved and large batches which may take long periods of time to cool, solubilize and/or remove from the reaction vessel do not result in significant variability in the resin properties over time. By comparison, a resin product made by the traditional processes will typically begin to gel or at the very least undergo undesirable transformations when held at elevated temperatures after a reaction period. Accordingly, previously used processes limit the production of large batches and may cause significant variability of resin properties from batch to batch.

The above and other features and advantages of the invention will be evident from the ensuing description and appended claims.

DETAILED DESCRIPTION OF THE INVENTION

In the practice of the process of the present invention, an amount of rosin such as gum rosin, wood rosin or most preferably tall oil rosin, is added to a reaction vessel, preferably a pressure vessel, that has been purged with an inert gas such as nitrogen or carbon dioxide. The rosin may be added to the reaction vessel in either solid or molten form. Regardless of whether the rosin is in solid or molten form, the rosin is then heated to and/or maintained at a temperature within the range of from about 175° C. to about 225° C. under an inert gas atmosphere.

Once the rosin is at the desired reaction temperature, an ethylenically unsaturated carboxylic acid is added to the reaction vessel. The ethylenically unsaturated carboxylic acid may be selected from the mono-, di- and polybasic ethylenically unsaturated aliphatic carboxylic acids and anhydrides thereof as well as mixtures of two or more ethylenically unsaturated carboxylic acids or anhydrides. Accordingly, the ethylenically unsaturated carboxylic acid may be selected from acrylic acid, crotonic acid, methacrylic acid, sorbic acid, maleic acid, methylmaleic acid, ethylmaleic acid, propylmaleic acid, butylmaleic acid, fumaric acid, and the like as well as anhydrides thereof. Preferred ethylenically unsaturated carboxylic acids are the dibasic acids or anhydrides thereof, more preferably maleic acid, maleic anhydride, and fumaric acid, most preferably fumaric acid and maleic anhydride.

The amount of acid added to the reaction vessel is related to the degree of functionality desired. Accordingly, for more highly functionalized rosins, more acid is required. Typically, it is preferred to add from about 5 to about 35 wt. % acid based on the total weight of rosin charged to the reaction vessel. More acid may be used, however, there may be no appreciable advantage in using more than about 27 wt. % acid. More preferably, the amount of acid added to the reaction vessel is within the range of from about 10 to about 27 wt. % and most preferably from about 15 to about 25 wt. % based on the total weight of rosin charged to the reaction vessel.

The acid may be added to the reaction vessel all at once, or may be added to the reaction vessel over time. As noted above, the acid may be added after the rosin is at the desired reaction temperature or the acid and rosin may be added to the reaction vessel essentially simultaneously before or during the rosin heating step. Regardless of the sequence of rosin and acid addition, it is preferred to add the acid to the reaction vessel as quickly as possible within the constraints of the equipment and the ability to maintain the rosin at the desired reaction temperature. Thus, the adduct formation step is not limited to batch reactions and may also be conducted in continuous or semi-continuous reaction schemes.

Once all of the acid is in the reaction vessel, the reactants are maintained at the reaction temperature for a period of time sufficient to form the rosin adduct. Rosin/acid adducts are commonly referred to in the trade as fortified rosin. Fortification of rosin is well known in the art and is described in U.S. Pat. No. 2,994,635, the disclosure of which is incorporated by reference. The time required to fortify the rosin is to some degree dependant on the effectiveness of mixing of the reactants. For well mixed reaction vessels, time periods of 30 minutes to 10 hours or more may be required. Typically, the rosin/acid adduct reaction is substantially complete in about 1 to about 5 hours of reaction time.

The reaction of the rosin and ethylenically unsaturated carboxylic acid need not be conducted at superatmospheric pressure. Accordingly, the rosin/acid adduct may be formed at atmospheric, subatmospheric or superatmospheric pressure. It is preferred, however, to maintain an inert gas atmosphere in the reaction vessel during the adduct formation reaction.

After forming the rosin/acid adduct, a polyol is added to the adduct in the reaction vessel. The polyols used in the process of the present invention may be selected from any of the commercially available polyhydroxy-containing compounds. Of the commercially available polyols, pentaerythritol and glycerol are preferred due to their availability and low cost. However, polyols such as ethylene glycol, propylene glycol, 1,3-propanediol, 1,2-butanediol, 2,3-butanediol, 1,4-butanediol, pinacol, diethylene glycol, dipropylene glycol, polyethylene glycol, polypropylene glycol, dipentaerythritol, tripentaerythritol and the like may also be used in the process of the present invention.

The amount of polyol added to the reaction vessel is again largely a function of the desired degree of residual functionality and final resin molecular weight. In general, the amount of polyol may be within a range of from about 1 to about 40 wt. % based on the weight of rosin charged. A more preferred amount of polyol is within the range of from about 5 to about 35 wt. % and most preferably from about 5 to about 32 wt. % based on the weight of rosin charged to the reaction vessel.

The polyol may be pumped, under pressure, into the reaction vessel having an inert gas blanket, or the polyol may be charged to the reaction vessel while purging the vessel with inert gas. Regardless of the method for charging the reaction vessel with polyol, it is important to maintain an inert gas atmosphere in contact with the reactants. Furthermore, the polyol may be charged to the reaction vessel while the reaction mass is still at the adduct reaction temperature. Although not preferred, the reaction mass may be cooled subsequent to the rosin/acid adduct formation reaction prior to charging the polyol.

Once charged, the reaction vessel is closed and the reaction mixture is maintained at an elevated temperature for a period of time sufficient to obtain a partially esterified rosin based resin with a target acid number. Target acid numbers are in the range of from about 80 to about 260 and most preferably in the range of from about 110 to about 220. The acid number of the resin ester is determined by the standard ASTM D465-59 procedure.

During the adduct/polyol reaction, the temperature of the reactants is maintained in the range of from about 185° to about 240° C. Typically it is necessary to add heat to the reaction mass in order to maintain the foregoing reaction temperatures as the reaction is not exothermic. These temperatures are preferably maintained throughout the reaction period. The reaction period may range from about 30 minutes to about 10 hours or more depending mainly on reaction temperature and the stoichiometry of the reactants. Agitated vessels are preferred in order to obtain intimate mixing of the reactants and shorter reaction periods.

Since the adduct/polyol reaction is a condensation reaction, water is formed as the esterification of the fortified rosin occurs. An important aspect of the process of the invention is the retention in the vessel of all or at least a portion of the water formed during the condensation reaction. The retention of a selected amount or all of water in the reaction mass effectively limits the progress of the reaction so that carboxylic acid and hydroxyl functionalities are retained in the rosin ester resin. Accordingly, by careful selection of the amount of water retained in the reaction mass, precise control of the degree of esterification of the rosin/acid adduct is achieved with concomitant retention of carboxylic and hydroxyl acid functionalities. Furthermore, the desired degree of esterification may be selected by removing water from the reaction vessel or adding additional water to the reaction vessel to obtain more or less esterification of the fortified rosin and the rate of water removal (if any) and/or water addition (if any) may be staged or phased over the reaction interval to achieve the desired end product properties. It will be recognized that a broad range of partially esterified rosin resins with varying degrees of residual functionality may be produced with the foregoing techniques.

A particularly preferred means for retaining water in the reaction vessel is to perform the esterification step in a closed reaction vessel under superatmospheric conditions. As water is formed, an autogenous pressure builds in the reaction vessel due to the vaporization of the water formed at the elevated reaction temperatures. The degree of esterification of the adduct may be controlled by the rate of water removal or addition to the reaction vessel. The pressure in the reaction vessel at the reaction temperatures will typically not be above about 150 psia (929 kPa) in the range of the desired acid numbers for the product. Ordinarily, the pressure at final product conditions will be in the range of from about 25 to about 115 psia (170 to 700 kPa).

An advantage of the process of the invention is that the partially esterified reaction product may be held in the reaction vessel at an elevated temperature and superatmospheric pressure for 24 hours or more without any significant further esterification of the adduct. That is, the acid number of the product and its molecular weight level off at a point during the reaction short of full esterification. The adduct/polyol reaction product may then be packaged as a solid by flaking the product on a chilled flaker. While it is not required, the rosin/acid adduct formation reaction may also be conducted in the pressurized reaction vessel used for the esterification reaction. Accordingly, the invention is preferably practiced using a single pressurizable reaction vessel which may be sealed, pressurized, heated, or cooled, as necessary, and wherein the contents may be continuously mixed. Those of ordinary skill in the art are believed to possess the requisite understanding concerning the selection, operation and control of such equipment as may be used in the practice of the invention. Accordingly, details of equipment configurations and the like are omitted for the sake of clarity. It will be recognized that while the reactions are described as batch-type reactions, the invention is susceptible to being practiced under continuous or semi-continuous operating conditions.

According to yet another aspect of the invention, the partially esterified resin may be solubilized in situ without intermediate processing steps such as purification or solidification. In this case, the reaction product containing the resin is first cooled to a temperature within the range of from about 160° to about 200° C., preferably about 170° to about 190° C. and most preferably about 180° C., and the solvent is added to the reacted vessel under superatmospheric pressure as the reaction product is further cooled to about 40° C. The cooling rate of the reaction product is such that solubilization of the product occurs before any substantial solidification of the product takes place. When alcohol is used as the solvent, the amount of alcohol added may range from about 50 wt. % to about 110 wt. %, based on the weight of the resin to be dissolved. The preferred alcohol solvent is an alkanol having from 1 to 4 carbon atoms selected from the group consisting of methanol, ethanol, isopropyl alcohol, n-propanol, n-butanol and mixtures thereof, most preferably ethanol.

When water is used as a solvent, it is preferred to first contact the reaction products with an amine or ammonia/ammonium hydroxide, preferably an amine, in order to form soluble salts of the reaction product. In this case, the reaction mass is preferably first cooled to a temperature within the range of from about 170° C. to about 200° C. so that the reaction mass remains substantially molten during the neutralization process.

The amine is preferably added to the reaction vessel under pressure. The amount of amine added to the reaction vessel is preferably from about 10 wt. % to about 20 wt. % based on the weight of the rosin charged to the reaction vessel, though this is a function of the amine's molecular weight. Once neutralized, water in an amount ranging from about 30 wt. % to about 110 wt. %, based on the weight of the resin to be dissolved, is then added to the reaction vessel under pressure. Agitation of the reaction vessel contents during the water and amine addition may aid in solubilizing the reaction product.

While not required, an amine may also be added to the alcohol solubilized reaction products in order to neutralize some or all of the residual acid functionality. Again, the amount of amine added to the reaction vessel will typically range from about 10 wt. % to about 20 wt. % based on the weight of the rosin initially charged to the reaction vessel.

Any one of a number of amines may be used to improve the solubility of the resin. The amine may be a monoamine, a diamine or a polyamine. A preferred amine is an alkanolmonoamine selected from the group consisting of primary, secondary and tertiary monoamines such as dimethylethanolamine, monomethylethanolamine, ethanolamine, diethanolamine, butylethanolamine, methyldiethanolamine, and mixtures thereof with dimethylethanolamine being the most preferred amine. However any amine capable of forming a salt with the residual acid functionality may be used to assist in solubilizing the resin. In the alternative, ammonia or ammonium hydroxide may be used to neutralize the resin.

In order to facilitate a further understanding of the invention, the following Examples are given. These examples are for illustrative purposes and therefore do not limit the invention in any way.

EXAMPLE I

A resin was prepared according to the method of the present invention by placing 1000 grams of tall oil rosin in an autoclave equipped for heating, cooling, pressurizing and stirring the reaction medium. The rosin was heated to 200° C. under a nitrogen atmosphere. Fumaric acid in the amount of 240 grams was added to the heated rosin and the mixture was reacted for 4 hours at 200° C. at atmospheric pressure under a nitrogen gas blanket in order to form a rosin/fumaric acid adduct. At the end of the 4 hour reaction period, 300 grams of pentaerythritol were added to the rosin/fumaric acid adduct. The autoclave was sealed under nitrogen, and the temperature of the reaction mass was increased to 210° C. The pressure in the autoclave was allowed to build autogenously as the reaction progressed due to the formation of water during the esterification of the adduct. After approximately 8 hours, the reaction mixture had an acid number of about 141.5 (ASTM D465-59) and a softening point of 132° C. (ASTM E28-67). At this point, the pressure in the autoclave was about 135 psia (929 kPa). The reaction mass was maintained at 210° C. and 135 psia (929 KPa) for an additional 5 hours after which the acid number was 134.1 and the softening point was 136° C. After being held for a total of 15 hours at this temperature and pressure, the product remained a flowable liquid without an appreciable change in the acid number (124.8) and softening point (140.5° C.) of the resin from that of the product after the initial 8 hour reaction period. Analysis of the resin product by Gel Permeation Chromatography confirmed that only minor changes in the molecular weight distribution of the partially esterified resin occurred during the 15 hour hold time after the initial 8 hour reaction time.

EXAMPLE II

A resin was prepared according to the method of the present invention by the procedure of Example I. The reaction product was cooled to 180° C. and 1000 grams of ethanol were added to the autoclave while maintaining the pressure in the autoclave. The reaction product was then cooled to 40° C. and 175 grams of ethanolamine were added to the reaction mass containing the resin product and alcohol. After a brief period of stirring, the resin solution was removed from the autoclave. An infrared spectrum of the resin after isolation from the solution indicated that the resin was substantially the same as resin recovered from a solution of resin prepared by solubilizing a resin that is first cooled then flaked.

EXAMPLE III

A resin was prepared according to the method of the present invention by placing 1000 grams of tall oil rosin in an autoclave equipped for heating, cooling, pressurizing and stirring the reaction medium. The rosin was heated to 200° C. under a nitrogen atmosphere. Fumaric acid in the amount of 210 grams was added to the heated rosin and the mixture was reacted for 2 hours at 200° C. at atmospheric pressure under a nitrogen gas blanket in order to form a rosin/fumaric acid adduct. At the end of the 2 hour reaction period, 270 grams of pentaerythritol were added to the rosin/fumaric acid adduct. The autoclave was sealed under nitrogen, and the temperature of the reaction mass was increased to 220° C. The pressure in the autoclave was allowed to build autogenously as the reaction progressed due to the formation of water during the esterification of the adduct. After approximately 4 hours, the reaction mixture had an acid number of about 145 (ASTM D465-59) and a softening point of 115° C. (ASTM E28-67). At this point, the pressure in the autoclave was about 75 psig (618 kPa). The reaction mass was then cooled to 185° C. and a mixture of 25 grams of dimethylethanolamine and 350 grams of water were pumped into the autoclave under pressure. As the water/amine solution was charged to the autoclave, the reaction mass was cooled to 130° C. At a temperature of 130° C., 225 grams of monoethanolamine were pumped into the autoclave. The reaction mass in the autoclave was cooled to a final temperature of 70° C. while charging the monoethanolamine. Final product analyses indicated that the product had a pH of 8.0 to 8.45, a solids content of 80 to 85 wt. % and a solution color of 16.

The next example is not of this invention, but is given for comparative purposes.

EXAMPLE IV

A resin was prepared according to the method currently used in the art by placing 1000 grams of tall oil rosin in a round bottom flask equipped with heating and stirring capability and blanketed with a nitrogen purge. After the rosin was heated to 200° C., a total of 240 grams of fumaric acid were added to the reaction flask. The adduction reaction was allowed to proceed for 4 hours at 200° C. at atmospheric pressure under a nitrogen purge. At the end of the 4 hour reaction period, 300 grams of pentaerythritol were added to the rosin/fumaric acid adduct. The temperature of the reaction mass was adjusted to 210° C. and the reaction was allowed to proceed at atmospheric pressure with water being removed from the reaction flask as it was formed with the aid of the nitrogen purge. After 4 hours, the reaction mass became very viscous and after 6 hours there was extensive gelation of the reaction mass unlike the resin formed in Examples I and III.

Although several embodiments of the invention have been described in the foregoing detailed description, those of ordinary skill will recognize that the invention may be capable of numerous modifications, rearrangements and substitutions of substantial equivalent materials and steps without departing from the spirit and scope of the appended claims.

What is claimed is:

1. A process for preparing a rosin ester resin which comprises:

reacting rosin with from about 5 to about 35 wt. %, based on the weight of rosin, of an ethylenically unsaturated carboxylic acid in a reaction vessel to form an adduct thereof;

reacting the adduct in a closed reaction vessel at superatmospheric pressure and elevated temperature with from about 1 to about 40 wt. %, based on the weight of rosin, of a polyol to form a rosin ester reaction product and water of reaction; and retaining at least a portion of the water of reaction in the reaction vessel during the adduct/polyol esterification reaction whereby the progress of the adduct/polyol esterification reaction is limited to enable achievement of a desired degree of partial esterification as a function of the amount of water retained in the vessel.

2. The process of claim 1 wherein the ethylenically unsaturated carboxylic acid is a dibasic acid or anhydride thereof.

3. The process of claim 2 wherein the dibasic acid or anhydride thereof is selected from the group consisting of maleic acid, fumaric acid and maleic anhydride.

4. The process of claim 1 wherein the polyol is selected from the group consisting of pentaerythritol, glycerol, and organic diols.

5. The process of claim 1 wherein the rosin is heated to a temperature within the range of about 175° C. to about 225° C. prior to reacting the rosin with the acid.

6. The process of claim 1 wherein an amount of water is added to the reaction vessel while reacting the adduct with the polyol wherein the total amount of water added to the reaction vessel in addition to the water formed during the adduct/polyol reaction is sufficient to obtain a product having an acid number in the range of from about 80 to about 260.

7. The process of claim 1 wherein all of water of reaction is retained in the reaction vessel during the adduct/polyol reaction.

8. The process of claim 1 further comprising neutralizing the rosin ester reaction product with an amine at an elevated temperature and superatmospheric pressure.

9. The process of claim 8 further comprising diluting the neutralized reaction product with additional water while maintaining an elevated temperature and superatmospheric pressure in the reaction vessel, thereby forming an aqueous solution containing the neutralized rosin ester reaction product.

10. The process of claim 1 further comprising diluting the reaction product with alcohol while maintaining an elevated temperature and superatmospheric pressure in the reaction vessel, thereby forming an alcohol solution containing the rosin ester reaction product.

11. The process of claim 1 wherein the rosin/acid reaction and adduct/polyol reaction are conducted in the same reaction vessel.

12. The process of claim 1 wherein the rosin is charged to the reaction vessel as a solid or a liquid, then the acid is charged to the reaction vessel containing the rosin.

13. A process for preparing a rosin ester resin having a target acid number in the range of from about 80 to about 260 which comprises:

reacting rosin in a reaction vessel with from about 5 to about 30 wt. %, based on the weight of rosin, of an ethylenically unsaturated carboxylic acid in a reaction vessel to form an adduct thereof;

reacting the adduct in a closed reaction vessel at superatmospheric pressure and elevated temperature with from about 1 to about 40 wt. %, based on the weight of rosin, of a polyol to form a rosin ester reaction product and water of reaction; and retaining in the closed reaction vessel during the adduct/esterification reaction a selected portion of the water of reaction, whereby the progress of the adduct/polyol esterification reaction is limited to enable achievement of the desired acid number as a function of the amount of water retained in the reaction vessel.

14. The process of claim 13 wherein the ethylenically unsaturated carboxylic acid is a dibasic acid or anhydride thereof.

15. The process of claim 14 wherein the dibasic acid or anhydride thereof is selected from the group consisting of maleic acid, fumaric acid and maleic anhydride.

16. The process of claim 13 wherein the polyol is selected from the group consisting of pentaerythritol, glycerol, and organic diols.

17. The process of claim 13 wherein the rosin is heated to a temperature within the range of about 175° C. to about 225° C. prior to reacting the rosin with the acid.

18. The process of claim 13 wherein an amount of water is added to the reaction vessel while reacting the adduct with the polyol wherein the total amount of water added to the reaction vessel in addition to the water of reaction is sufficient to obtain a product having an acid number in the range of from about 80 to about 260.

19. The process of claim 13 wherein an amount of water is removed from the reaction vessel during the adduct/polyol reaction wherein the total amount of water in the reaction vessel is sufficient to obtain an acid number in the range of from about 80 to about 260.

20. The process of claim 13 further comprising neutralizing the rosin ester reaction product with an amine at an elevated temperature and superatmospheric pressure.

21. The process of claim 20 further comprising diluting the neutralized reaction product with additional water while maintaining an elevated temperature and superatmospheric pressure in the reaction vessel, thereby forming an aqueous solution containing the neutralized rosin ester reaction product.

22. The process of claim 13 further comprising diluting the reaction product with alcohol while maintaining an elevated temperature and superatmospheric pressure in the reaction vessel, thereby forming an alcohol solution containing the rosin ester reaction product.

23. The process of claim 13 wherein the rosin/acid reaction and adduct/polyol reaction are conducted in the same reaction vessel.

24. The process of claim 13 wherein the rosin is charged to the reaction vessel as a solid or a liquid, then the acid is charged to the reaction vessel containing the rosin.

* * * * *